Patented Feb. 15, 1944

2,341,557

UNITED STATES PATENT OFFICE 2,341,557

PROCESS OF PREPARING KETONES OF THE CYCLOPENTANO HYDROPHENANTHRENE SERIES AND PRODUCT

Percy L. Julian, Maywood, and John Wayne Cole, Chicago, Ill., assignors to The Glidden Company, Cleveland, Ohio, a corporation of Ohio No Drawing. Application November 17, 1941, Serial No. 419,426

9 Claims. (Cl. 260—397.1)

The present invention relates to certain degradation products of bile acids and acids secured by oxidative degradation of sterols, and more particularly relates to diketones of the cyclopentano hydrophenanthrene series.

The object of the present invention is to provide a simpler and cleaner series of reactions whereby bile acids, or acids secured by oxidative degradation of sterols, might be converted into diketones. Still another object of this invention is to provide a simple and novel synthesis of the corpus luteum hormone. The present method also provides a method for preparing homologus of the corpus luteum hormone certain of which have a physiological activity similar to the corpus luteum hormone. Other objects will become apparent to those skilled in the art.

Surprisingly little work has been done with acyl chlorides in the cyclopentanophenanthrene series. We have found that $\Delta^5$-3-acetoxy-bisnorcholenic acid is readily converted into a crystalline chloride by the action of thionyl chloride under suitable conditions. $\Delta^5$-3-acetoxy-bisnorcholenyl chloride (Formula I) is a useful raw material in the synthesis of valuable compounds in the cyclopentanophenanthrene series. It reacts very smoothly, for example, with phenyl zinc chloride to give $\Delta^5$-3-acetoxy-bisnorcholenyl-phenyl ketone, (Formula II) in almost quantitative yield.

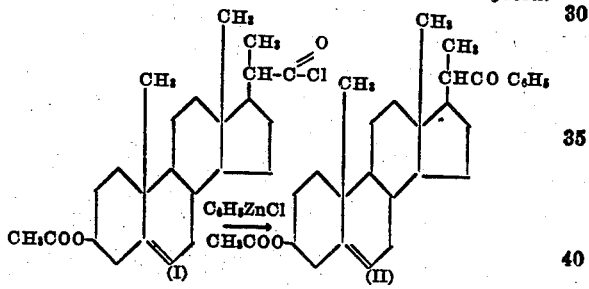

The ease with which the acyl chloride of the bisnorcholenic acid undergoes the above transformations has led us to explore similar reactions with acyl chlorides of the 3-keto cyclopentano hydrophenanthrene series since such a procedure would provide a method for preparing progesterone and homologus thereof which it was thought might be found to have physiological activity similar to the corpus luteum hormone.

Thus the treatment of $\Delta^4$-3-keto-bisnorcholenyl chloride (III) and $\Delta^4$-3-keto-etio-cholenyl chloride (IV) with alkyl and aryl compounds of zinc, cadmium and aluminum yield the corresponding 3-22-(V) and 3-20-(VI) diketones.

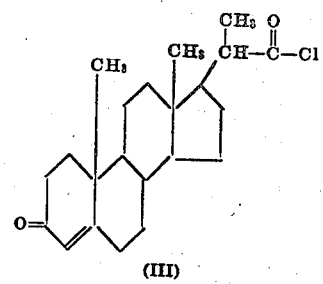

(III)

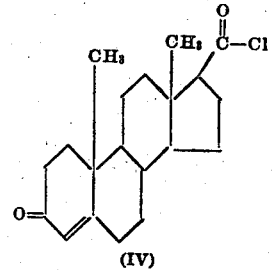

(IV)

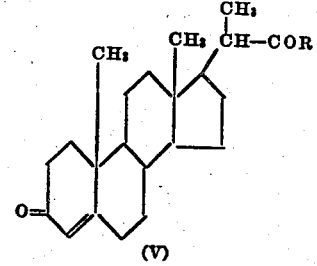

(V)

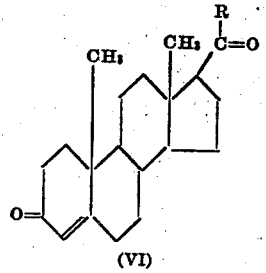

(VI)

The following examples are illustrative of the invention:

Example I

To an ether solution of 3.5 grams of methyl-magnesium iodide was added a solution of 3 grams of fused zinc chloride in 200 cc. of anhydrous ether. After 30 minutes stirring, an ether solution of 1.5 grams of $\Delta^4$-3-keto-bisnorcholenyl chloride (prepared from $\Delta^4$-3-keto-bisnorcholenic acid of melting point 252° by treatment with thionyl chloride) was added, and the mixture stirred at room temperature for four hours. The cooled reaction mixture was shaken with 2% $H_2SO_4$ and ether, and the washed ether layer concentrated. Diluting the concentrate with 2 cc. acetone caused the separation of crystals melting at 195°–200°. By fractional crystallization from acetone there were obtained (1) prisms of the diketone melting at 205–207°, (2) needles of an isomer of the diketone melting at 190–191°, and (3) a low-melting mixture of isomers. Bio-assay showed positive progestational activity in the latter fraction.

Example II

A solution containing dimethylcadmium was prepared by adding 7.0 grams anhydrous cadmium chloride to 150 cc. of an ether solution of methyl-magnesium bromide prepared from 1.3 grams of magnesium and excess methyl bromide. After stirring the dimethylcadmium solution for 30 minutes, a benzene solution of 4.0 grams of the acid chloride prepared from $\Delta^4$-3-keto-bisnorcholenic acid was added rapidly and the mixture stirred at 30° C. for six hours. The ether-benzene solution was washed with cold 2% sulfuric acid, with water, with 5% sodium hydroxide solution, and again with water. The solvents were removed by steam distillation and the residue dissolved in a small amount of acetone and allowed to crystallize, whereupon prisms (melting at 197–200°) of the diketone formed. A lower melting mixture of isomers was secured as a by-product.

This application is a continuation-in-part of application Serial No. 388,899, filed April 16, 1941.

Having described the invention what is claimed is:

1. The process of producing diketones of the cyclopentano hydrophenanthrene series which comprises converting a 3-keto acid of the cyclopentano hydrophenanthrene series to the acid chloride, and treating the 3-keto acid chloride with an organo-metallic reagent selected from the class consisting of alkyl and aryl compounds of cadmium, zinc and aluminum to form the diketone.

2. The process for producing diketones of the formula

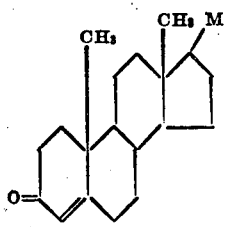

in which M is a group selected from the class consisting of —COR and

in which R is a hydrocarbon radical, which comprises subjecting an acid chloride compound of the formula

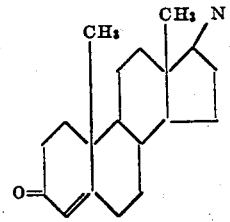

in which N is a group selected from the class consisting of —COCl and

to the action of an organo-metallic reagent selected from the class consisting of alkyl and aryl compounds of zinc, cadmium and aluminum.

3. The process for producing ketones of the general formula

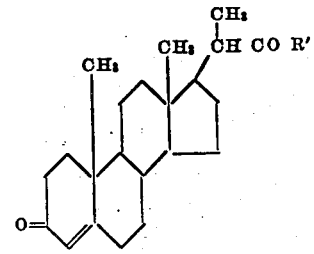

where R' is a hydrocarbon radical, which comprises subjecting an acid chloride of the formula

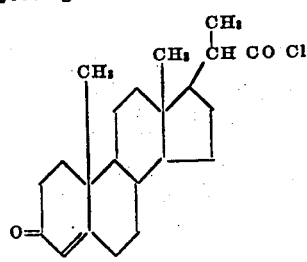

to the action of a compound of the formula R'ZnX in which R' is a hydrocarbon radical and X is a halide radical.

4. The process for producing ketones of the general formula

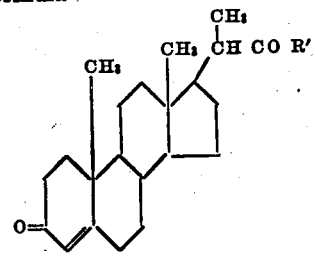

where R' is a hydrocarbon radical, which comprises subjecting an acid chloride of the formula

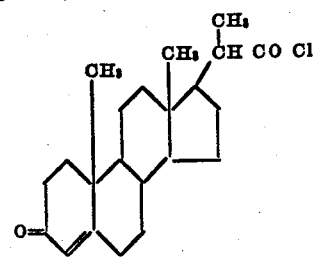

to the action of a compound of the formula $R'_2Cd$ in which $R'$ represents a hydrocarbon radical.

5. Acid chlorides of the 3-keto-cyclopentano hydrophenanthrene series.

6. $\Delta^4$-3 keto-ter-nor-cholenyl alkyl ketones.

7. $\Delta^4$-3 keto-ter-nor-cholenyl methyl ketones.

8. Compounds of the formula:

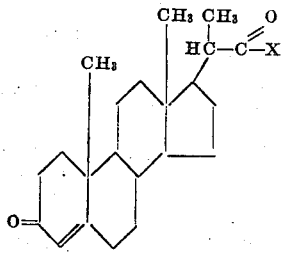

in which X is selected from the group consisting of $Cl^-$ and alkyl radicals.

9. The acid chloride of 3 keto-$\Delta$4-5 bisnor cholenic acid.

PERCY L. JULIAN.
JOHN WAYNE COLE.